May 31, 1960 J. M. EITEL 2,938,594
VEHICLE AND LIFT CONSTRUCTION
Filed April 9, 1959 6 Sheets-Sheet 1

INVENTOR.
Jay M. Eitel
BY
Attorneys

May 31, 1960   J. M. EITEL   2,938,594
VEHICLE AND LIFT CONSTRUCTION
Filed April 9, 1959   6 Sheets-Sheet 4

INVENTOR.
Jay M. Eitel
BY
Attorney

May 31, 1960    J. M. EITEL    2,938,594
VEHICLE AND LIFT CONSTRUCTION
Filed April 9, 1959    6 Sheets-Sheet 5

INVENTOR.
Jay M. Eitel
BY
Attorneys

May 31, 1960  J. M. EITEL  2,938,594
VEHICLE AND LIFT CONSTRUCTION
Filed April 9, 1959  6 Sheets-Sheet 6

INVENTOR.
Jay M. Eitel
BY
Attorneys

United States Patent Office 2,938,594
Patented May 31, 1960

2,938,594

VEHICLE AND LIFT CONSTRUCTION

Jay M. Eitel, 239 Frances Drive, Los Altos, Calif.

Filed Apr. 9, 1959, Ser. No. 805,182

21 Claims. (Cl. 182—2)

This invention relates generally to a vehicle and lift construction and more particularly to a vehicle and lift construction of the type having a workman's basket mounted on the free end of a boom raised and lowered about a horizontal axis and rotated about a vertical axis. This application is a continuation-in-part of application Serial No. 632,480, filed January 4, 1957.

In vehicle and lift constructions of the type utilized in the past it has been necessary for the operator to dismount from the vehicle and lower the workman's basket to the ground before he could step into the basket. This has been found to be very tiring and time consuming, particularly when the equipment is being utilized for such jobs as changing the bulbs in street lights. In equipment of this type, it also has been necessary for the operator to carry the tools, lamps and the like from the truck to the workman's basket which is laborious and time consuming.

In general, it is an object of the present invention to provide a vehicle and lift construction in which it is not necessary for the operator to dismount from the vehicle before entering the workman's basket.

Another object of the invention is to provide a vehicle and lift construction of the above character in which the operator may enter the workman's basket from the driving station of the vehicle.

Another object of the invention is to provide a vehicle and lift construction of the above character in which a space is provided in the cab adjacent the driving station of the vehicle for the workman's basket.

Another object of the invention is to provide a vehicle and lift construction of the above character in which the workman's basket is adapted to be positioned alongside the driving station of the vehicle.

Another object of the invention is to provide a vehicle and lift construction of the above character in which storage space is provided in the cab near the space for the workman's basket.

Another object of the invention is to provide a vehicle and lift construction of the above character in which the cab may be totally enclosed.

Another object of the invention is to provide a vehicle and lift construction of the above character in which the cab is enclosed and in which the workman's basket is adapted to be positioned outside the enclosed portion of the cab so that the workman's basket can be entered through an opening in the enclosed portion of the cab without dismounting from the vehicle.

Another object of the invention is to provide a vehicle and lift construction of the above character in which particularly novel means is provided for mounting the workman's basket on the boom.

Additional objects and features of the invention will appear from the following description in which the preferred embodiments have been set forth in detail in conjunction with the accompanying drawing.

Referring to the drawing.

In general, the present invention consists of a vehicle of the type having a cab mounted on the vehicle which has a space for an operator's driving station and a space adjacent the driving station for receiving a workman's basket mounted on the free end of a boom structure which can be raised and lowered on a horizontal axis and rotated about a vertical axis. The boom structure is adapted to be moved to lower the workman's basket into the space adjacent the driving station so that the operator of the vehicle can step into the workman's basket without dismounting from the vehicle. The cab is also constructed in such a manner that a storage space is provided near the space for the workman's basket. In addition, particularly novel means is provided for mounting the basket on the boom to facilitate entry of the workman's basket into the space adjacent the driving station.

When an enclosed cab is desired so that the vehicle can be readily operated in cold climates, an opening can be provided in the roof of the cab and the workman's basket raised and lowered through the opening. After the basket has been lowered into the opening, a cover is utilized for closing the opening. In another embodiment, the cab is provided with an enclosed portion and another open portion into which the workman's basket can be lowered. A door is provided in the enclosed portion of the cab so that the workman's basket can be entered without dismounting from the vehicle.

The vehicle and lift construction illustrated in Figures 1 to 7 of the drawing consists generally of a motorized vehicle 11 having front and rear wheels 12 and 13. A lift supporting structure 14 is mounted on the rear portion of the vehicle 11 in a manner similar to that described in my copending application Serial No. 560,621 filed January 23, 1956. As described in the above copending application, the lift supporting structure 14 is mounted for rotation about a vertical axis and carries an extensible boom structure 16. Means is carried by the lift supporting structure 14 for raising and lowering the boom structure about a horizontal axis carried by the lift supporting structure. Means is mounted on the boom structure for extending and retracting the boom structure as described in the above copending application.

Figure 1:
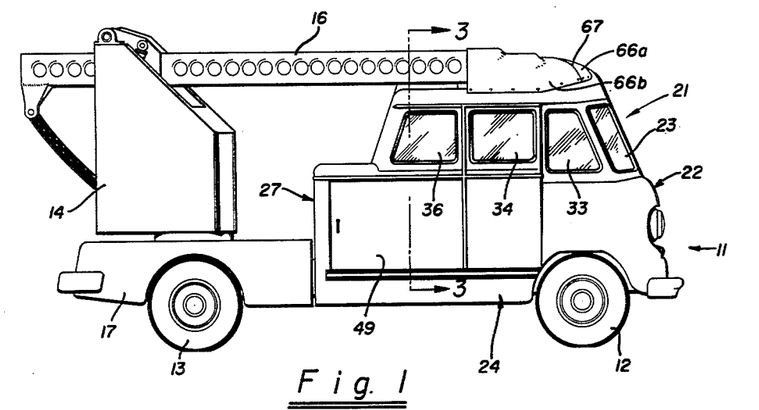
Figure 1 is a side elevational view of a vehicle and lift construction incorporating the present invention.

A platform 17 is also mounted on the rear of the vehicle below the lift supporting structure 14. A workman's basket 18 is pivotally mounted on the end of the extensible boom structure 16 in a manner hereinafter described.

Figure 2:
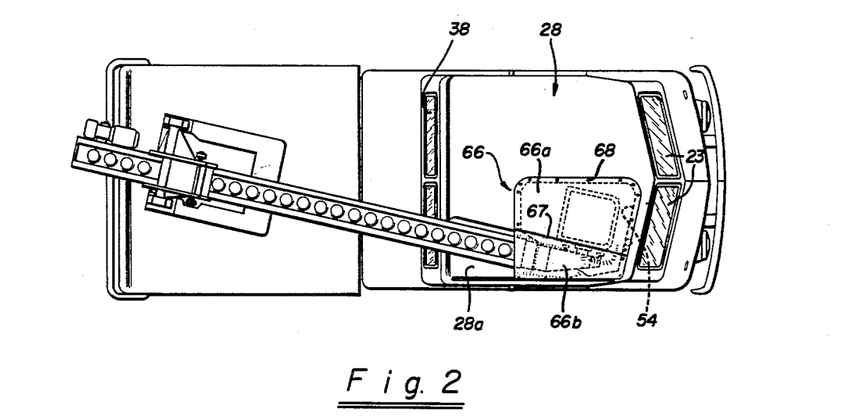
Figure 2 is a top plan view thereof.

A cab of particularly novel construction is mounted on the front end of the vehicle. The front 22 of the cab is of rather conventional construction and includes a pair of windshields 23. The front of the cab is joined to substantially vertical sidewalls 24 and 26. The sidewalls 24 and 26 are joined by a rear wall 27 which in section has a vertical portion 27a, a horizontal portion 27b and an inclined portion 27c. A roof 28 joins the front, rear, and sidewalls. The cab is provided with a floor 29 which is mounted on the framework for the vehicle. The cab is also provided with suitable window areas in addition to the windshields 23 which consist of side windows 33, 34 and 36 in each of the sidewalls 24 and 26 and rear windows 38 in the inclined portion 27c of the rear wall 27.

Figure 3:
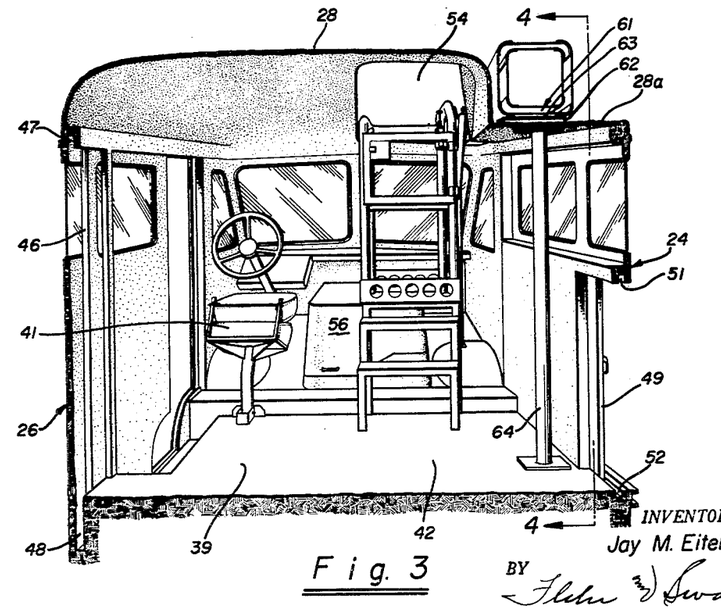
Figure 3 is a cross sectional view taken along the line 3—3 of Figure 1.
Figure 4:
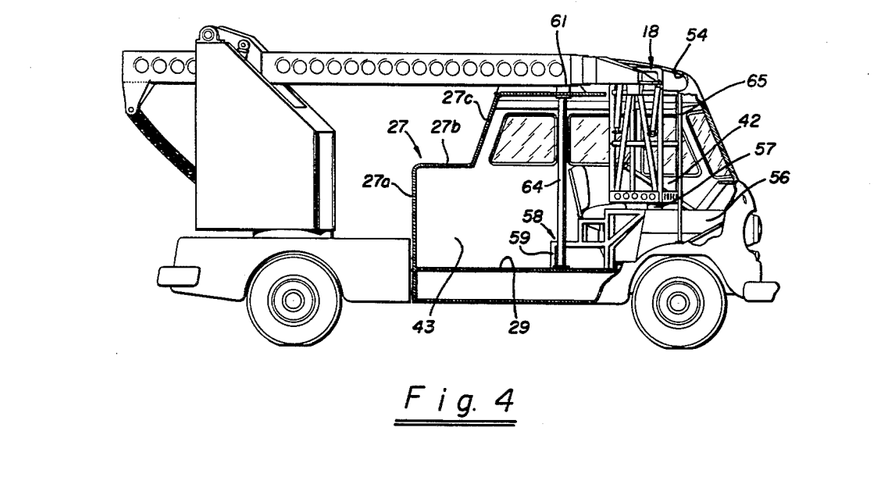
Figure 4 is a cross sectional view taken along the line 4—4 of Figure 3.

The cab as shown provides a space 39 for the operator's or driving station 41, a basket receiving space 42 and a storage space 43. It is preferable but not necessary that the basket receiving space 42 be alongside the driving station 41 for a purpose hereinafter described. It is desirable that the storage space 43 be near the basket receiving space 42 for a purpose also described hereinafter.

A sliding door 46 forms a part of the sidewall 26 and is mounted in tracks or guideways 47 and 48 for movement between open and closed positions to give the driver or operator access to the cab and the driving station. A sliding door 49 forms a part of the sidewall 24 and is mounted in tracks or guideways 51 and 52 for movement between open and closed positions to provide access to the storage space 43.

The roof 28 is provided with an opening 54 which is dimensioned to receive the workman's basket 18. A hood 56 is mounted within the cab and serves to enclose the motor for the vehicle. A bumper 57 of suitable material such as rubber is mounted on the hood 56 and is adapted to engage the bottom wall of the workman's basket 18 when the basket has been lowered through the opening 54 as shown particularly in Figure 4. A plurality of steps 58 are mounted on the floor 29 adjacent the hood 56 and are formed of suitable material such as angle members 59 to provide access to the basket as hereinafter described.

It will be noted that when the workman's basket is in the position shown in Figure 3 it rests alongside the operator's station 41 and is easily accessible from the operator's station. The storage space 43 has been provided adjacent the rear of the workman's basket 18 so that tools, replacement parts, equipment and other apparatus normally required by the operator in performing his work may be stored in this area.

The roof 28 is provided with a recessed portion 28a which accommodates the boom structure 16 when the workman's basket 18 has been lowered into the cab 21. At the time the bottom of the basket engages the bumper 57, the boom structure comes to rest on a suitable saddle 61 mounted on the roof. One saddle found to be satisfactory consists of a block 62 with a resilient pad 63 of suitable material such as rubber on its upper surface. Inside the cab below the saddle 61 I have provided a support post 64 which extends between the roof portion 28a and the floor 29 to reinforce the roof at that point so that the saddle 61 can carry the weight of the boom structure 16. Another post 65 is mounted in the cab near the front of the cab (Figure 4) and serves to prevent the workman's basket from swinging into the adjacent windshield 23.

Suitable means is provided for covering the opening 54 when the basket 18 has been lowered into the cab and consists of a canvas cover 66 of two sections 66a and 66b joined together by suitable means such as a zipper 67 which is operable from the interior of the cab. Suitable means such as snaps 68 are provided for securing the outer margins of the canvas cover to the roof of the cab.

Figures 5, 6, 7:
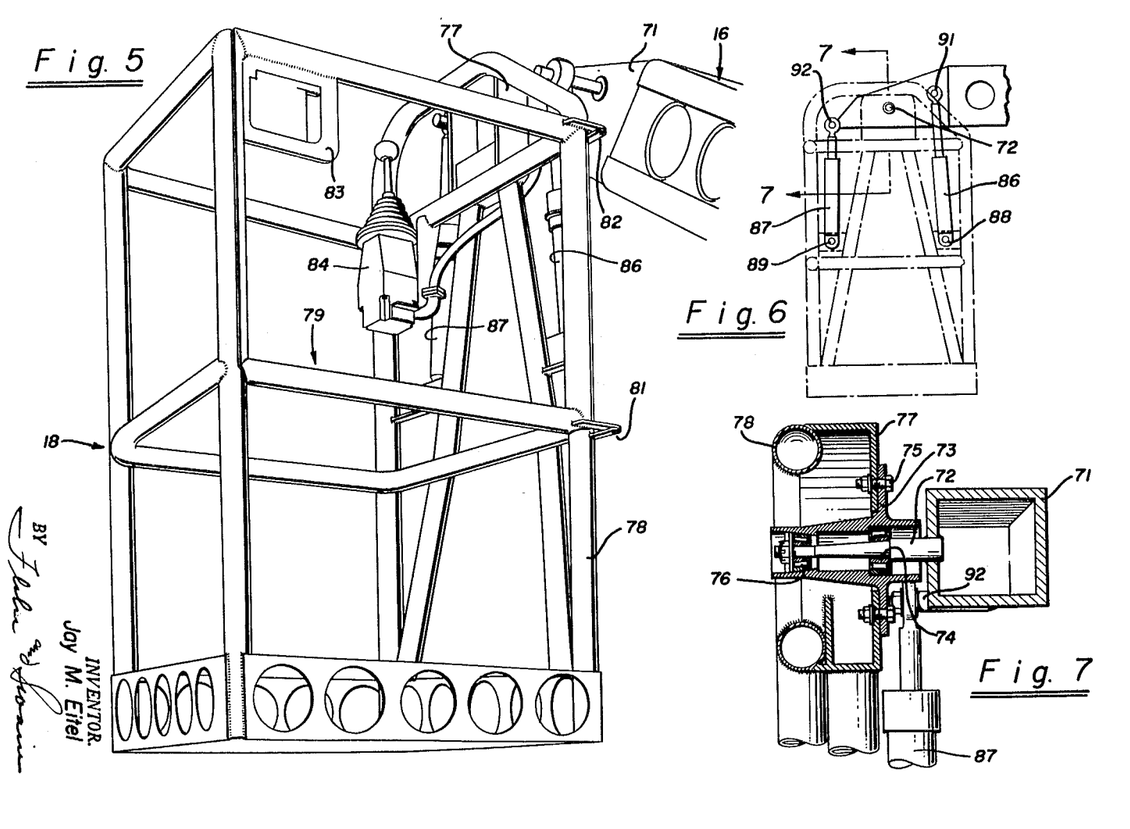
Figure 5 is an enlarged detail view of the workman's basket and the means for mounting the workman's basket on the free end of the boom.
Figure 6 is a side elevational view of the workman's basket and the means for mounting the workman's basket on the free end of the boom, the workman's basket being shown in phantom lines.
Figure 7 is a cross sectional view taken along the line 7—7 of Figure 6.

Particularly novel means is provided for mounting the workman's basket on the end of the boom structure 16 and consists of a boom fitting 71 which is mounted on the end of the boom structure 16 by suitable means such as welding. A stud shaft 72 is mounted on one side of the boom fitting 71 and extends at substantially right angles from the boom structure 16. A hub 73 is journalled on the stud shaft 72 by suitable means such as bearings 74 and 76.

A basket mounting member 77 is fixed to the hub 73 by suitable means such as bolts 75. The basket mounting member 77 is fixed to a plurality of tubular members 78 which form the box shaped workman's basket 18. A gate 79 hinged at 81 and 82 is also formed of tubular members 78 and may be opened by operation of a latch 83 to permit the workman to enter the basket.

A control mechanism 84 similar to that described in my copending application Serial No. 579,689, filed April 20, 1956, now Patent No. 2,841,659, is mounted in the workman's basket to control the location of the workman's basket and the extensible boom structure.

Suitable means is provided for preventing the free swinging of the basket 18 about the stud shaft 73 and consists of a pair of hydraulic dash pots 86 and 87 having their lower ends connected to the basket 18 at points 88 and 89 and their upper ends connected to mounting lugs 91 and 92 which are spaced from the stud shaft 72 and fixed to the boom fitting 71.

Operation of my combined truck and lift may now be described as follows: Let it be assumed that the combined truck and lift is in a position shown in Figure 1 of the drawing and that the truck has been driven to the desired location. The operator steps from the driving station and mounts the stairs or steps 58 and operates the zipper 67 to open the canvas cover 66. The snaps are then unfastened and the cover is removed and stowed away inside the cab.

After the operator has removed the canvas cover 66, he may pick up whatever tools and other apparatus he may need from the adjacent storage space 43. The gate 79 is opened after which he mounts the steps 58, enters the basket and closes the gate. The operator then operates the control mechanism 84 to raise the workman's basket and himself through the opening 54. After the workman's basket 18 has been raised to clear the opening 54, the operator can cause the basket and himself to be shifted to any desired location as described in my copending application, Serial No. 560,621, filed January 23, 1956.

After the operator has completed his work at that location he causes the basket to be moved to a position where it overlies the opening 54 after which he causes the basket to be lowered into the basket receiving space 42 adjacent the driving station. The operator may then dismount from the basket and go to the driving station to move the truck to the next desired location. The canvas cover 66 need only be replaced during inclement weather.

It is readily apparent that my combined truck and lift is particularly adapted for jobs such as changing bulbs in street lamps, and other work which must be performed at an elevation. Changing of bulbs can be readily accomplished by one workman because all the necessary equipment can be stored in the storage space 43. After picking up the necessary tools and lamp bulbs, the operator or workman need merely mount the basket and cause the basket to be raised to a position adjacent the street lamp in which the bulb is to be changed. After the bulb has been changed, he can readily lower himself into the cab after which he can move the truck to the next street lamp.

The particularly novel mounting of the workman's basket on the boom structure 16 makes it possible to readily lower the basket into the basket receiving space 42. Since only one side of the basket is mounted on the boom structure, the other three sides of the basket are clear and provide an unimpeded working space. The dash pots 86 serve to prevent rapid and undue swinging of the workman's basket.

Figure 8:
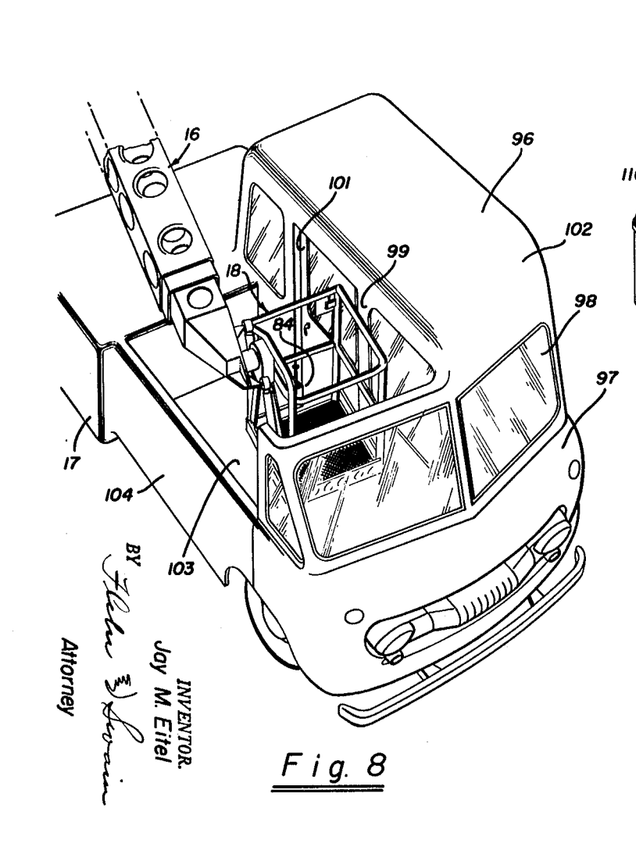
Figure 8 is a perspective view of another embodiment of my invention.

Another embodiment of my invention is shown in Figure 8 and consists of a cab, one half of which is open and one half of which is closed. The cab is comprised of a front wall 97 substantially identical to the front wall for cab 21 and includes windshields 98. A pair of substantially identical sidewalls 99 are provided and each include a sliding door 101 which gives access to the operator's or driving station for the vehicle.

A workman's basket receiving space 103 is provided on the other side of the cab adjacent the driving station but outside the sidewalls 99. A narrow side panel 104 connects the front of the cab to the platform 17.

It will be noted that when the workman's basket is in the position shown in Figure 8 that the upper portion of the basket is below the upper edge of the frontal windshield area and below the roof 96. Since the boom structure is at a level substantially the same as the roof of the cab 96, no additional clearance is required for the vehicle.

Operation of this embodiment of my invention is substantially similar to that hereinbefore described. A storage space is provided behind the driving station within the enclosed portion of the cab 96. Storage space is also available behind the basket 18 in the space 103.

To mount the workman's basket 18, the operator of the vehicle need merely open the sliding door 101 and step into the workman's basket. The control mechanism 84 may then be operated to move the workman's basket and the boom structure to any desired location.

Figure 9:
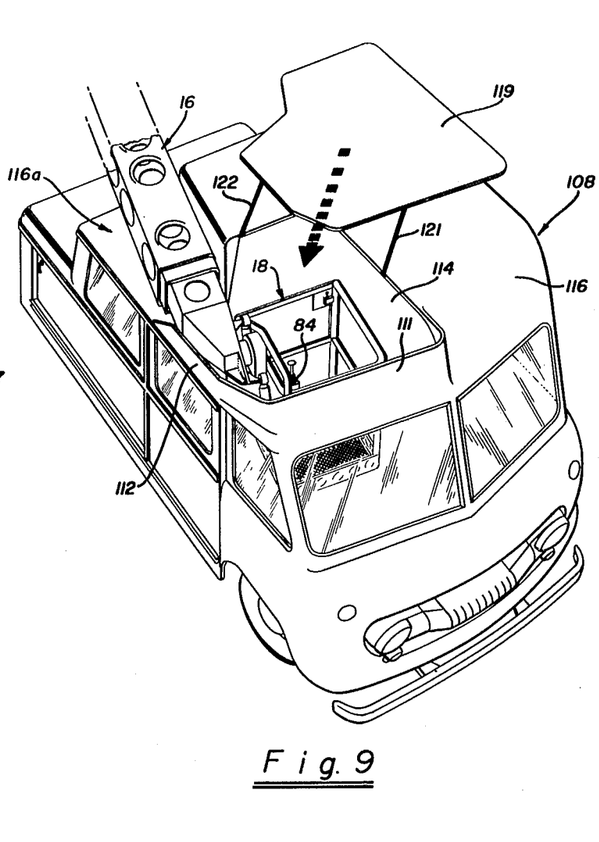
Figure 9 is a perspective view of another embodiment of my invention.

Another embodiment of my invention is shown in Figure 9 and consists of a cab 108 very similar to that shown in Figure 1 except that a different opening has been provided for receiving the workman's basket. As shown in the drawing, the upper portion of one side of the front wall forming the front of the cab has been provided with an extension 111. One sidewall has been provided with an extension 112 connected to extension 111. The extensions 111 and 112 form two sides of an opening 114 cut into the roof 116. The opening 114 is dimensioned to receive the workman's basket and lies substantially in one plane. The roof 116 is formed with a recess 116a to accommodate the boom structure 16. Since opening 114 lies in a single plane, it is possible to cover the opening with a relatively flat member rather than with canvas as shown in Figure 1.

One means found to be suitable for covering opening 114 consists of a substantially flat member 119 which is dimensioned to fit over the opening the opening 114. Suitable means is provided for moving the flat member or cover 119 between open and closed positions and consists of a pair of tracks 121 and 122 which are mounted on the roof 116. Means such as rollers (not shown) are mounted on the flat member 119, engage the tracks 121 and 122, and permit the member 119 to be slid longitudinally of the tracks.

By providing a cover of this type for the opening 114, it is readily apparent that the cover 119 may be readily moved between open and closed positions. The recess 116a accommodated the boom structure 16 after the workman's basket has been lowered into the space adjacent the driving station.

Figure 10:
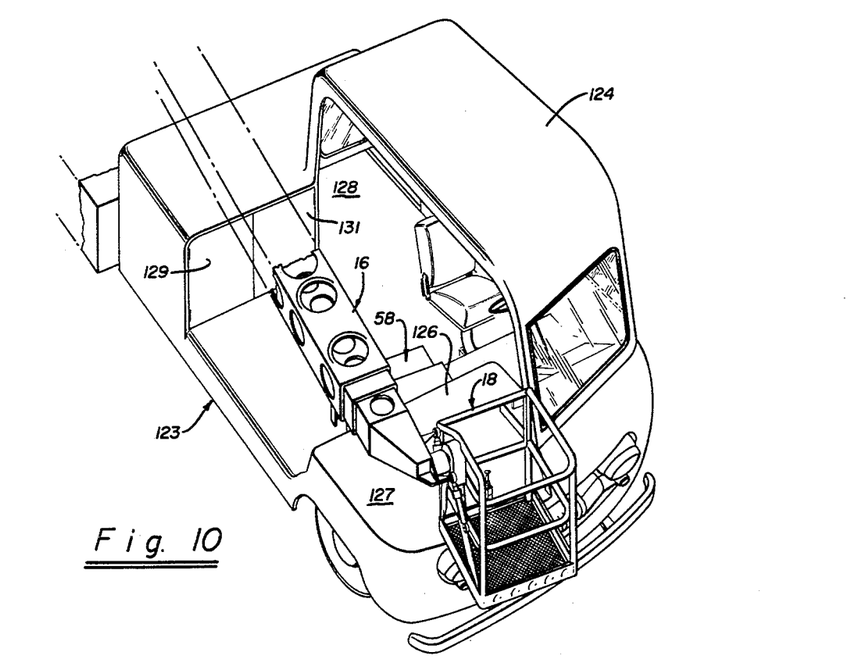
Figure 10 is a perspective view of another embodiment of my invention.
Figure 11:
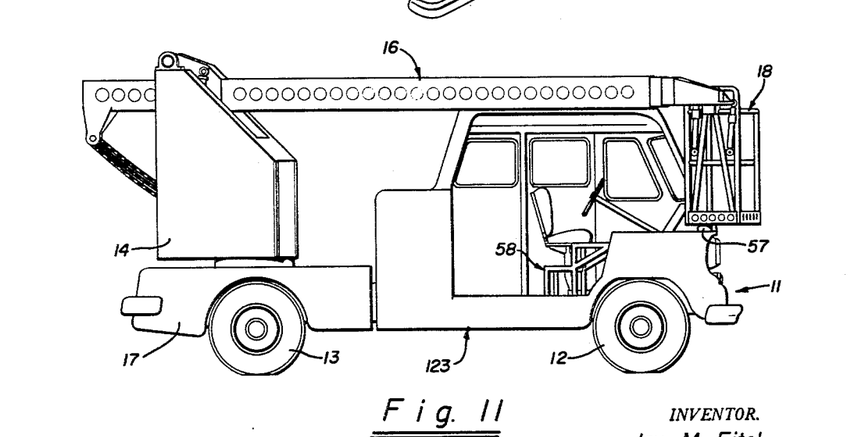
Figure 11 is a side elevational view of the embodiment of my invention shown in Figure 10.

Another embodiment of my invention is shown in Figures 10 and 11 and is similar to the cab in the embodiment of my invention shown in Figure 8. However, in this embodiment only one-half of the cab is provided with a frontal windshield area. The enclosed portion of the cab has one side which is completely open and the other side closed in a manner hereinbefore described.

The hood 126 for covering the engine has been extended so that it is flush with one side of the cab to provide a flat supporting surface 127 in the region adjacent the operator's driving station. The stairs 58 provide access to the top of the hood 126 from the operator's driving station so that the operator can mount the workman's basket 18. The workman's basket 18 rests on a resilient bumper 57 which is mounted on the forward portion of the hood 126.

If required, additional means such as a saddle mounted on a vertical support rod can be provided giving additional support to the boom structure 16.

The construction shown in this embodiment of my invention is particularly advantageous in that it is much more economical to construct. However, it still provides many of the advantages of the other embodiments of my invention. This embodiment of my invention is particularly adapted for use in regions having mild climates where no protection from the elements is required.

The construction of this embodiment of my invention is also advantageous in that it permits the utilization of a longer boom structure 16 on a vehicle having the same wheel base because the workman's basket can be positioned ahead of the frontal windshield area. With a boom structure of the same length as utilized in the other embodiments of my invention, a vehicle having a shorter wheel base may be used.

This embodiment of my invention still has many of the advantages of the other embodiments of my invention. For example, it permits the operator to dismount from the driving station and enter the workman's basket 18 without dismounting from the vehicle. The workman still has easy access to any storage space contained within the cab. For example, as shown, open storage space 128 within the enclosed portion 124 of the cab is readily accessible. Also as shown, additional enclosed storage space is provided in the space behind the hinged doors 129 and 131.

Figure 12:
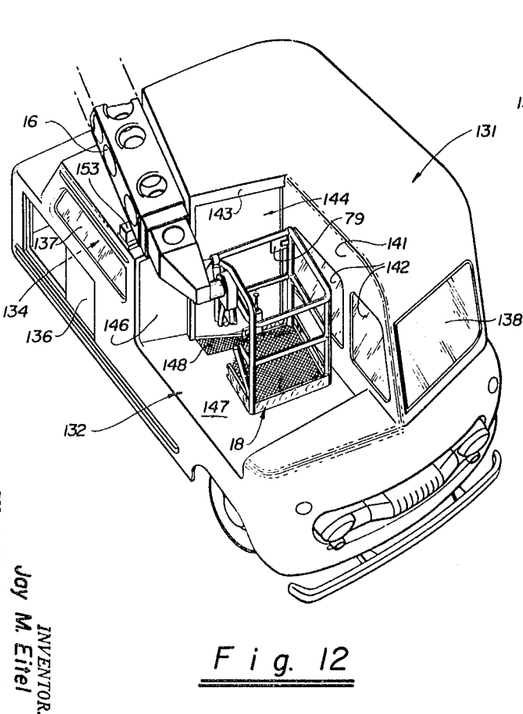
Figure 12 is a partial perspective view of another embodiment of my invention.
Figure 13:
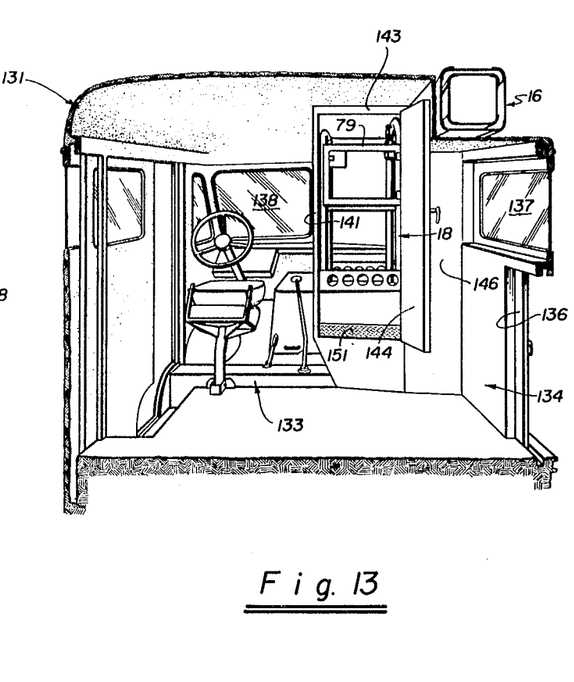
Figure 13 is a cross sectional view looking toward the front end of the vehicle of the embodiment of my invention shown in Figure 12.

Another embodiment of my invention is shown in Figures 12 and 13. In this embodiment, the cab is formed with an enclosed section 131 and an open section 132. The enclosed section 131 encloses a space for the driving station 133 and a storage space 134 to the rear of the driving station and extending the width of the truck. The storage space is open to the driver of the vehicle and is also accessible from outside the vehicle through a sliding door 136. A window 137 is provided to furnish light for the storage area.

The cab is provided with a windshield 138 in front of the driving station. The cab includes a dividing wall 141 which extends rearwardly from the front of the cab and serves to separate the cab into the enclosed and open portions or sections. The wall 141 has mounted therein a window 142 which permits viewing of the open section 132 of the cab from the driving station. The cab also includes an inclined wall 143 which extends sideways and to the rear of the wall 141. A door 144 is mounted in the side wall 143 and swings inwardly into the interior of the enclosed section of the cab as shown in Figure 13 when it is moved to an open position. A stop 146 is provided for the door to limit the position of the door when it is moved to an open position.

An additional wall 146 is joined to the wall 143 and serves to divide the space between the side wall 143 and the outer side wall of the cab. The wall 146 is inclined at an angle slightly less than that of the wall 143. The wall 143 extends at an angle as shown in order to make possible the use of a door of greater width to permit ready ingress and egress. A flat surface 147 forms the floor for the open portion 132 of the cab. A grate 148 is provided in the floor 147 adjacent the door 144 to permit snow and other debris which drops into the open section of the cab to be pushed through the grate. A step 151 is provided to facilitate entry of the open section 132 from the enclosed section of the cab of the vehicle.

As is readily apparent from the drawing, the workman's basket 18 carried by the boom structure 16 is adapted to be lowered into the space provided by the open section 132 of the cab. A boom support pad 153 is mounted on the roof of the cab for supporting the boom when the workman's basket has been lowered into the open portion of the cab. The workman's basket is adapted to rest on the floor 147 and the gate 79 of the basket is adapted to be opened outwardly into the opening provided in the side wall 143 when the door 144 has been moved to an open position.

It is, therefore, apparent that the driver of the vehicle by opening the door 144 and then the gate 79 can readily mount the workman's basket 18 without dismounting from the vehicle. The workman can then close the gate and move the boom to the desired location. There are many advantages to this type of construction. In particular, this type of construction adapts the vehicle for use during cold weather in which it is desirable to protect the operator from the elements for at least a portion of the time. By providing a separate space for the workman's basket, it is very easy to enclose the remaining portion of the cab. In this way, it is not necessary to provide a removable cover or covering for the section or portion of the cab which receives the workman's basket.

The storage space within the enclosed portion of the cab is still readily accessible to the operator of the vehicle that it can be used with ease.

It is apparent that I have provided a combined truck and lift which has many desirable features. By use of such a combined truck and lift, an operator may rapidly and readily perform a number of operations with a minimum of effort. The apparatus is particularly useful when work must be performed at elevations at different locations.

I claim:

1. In a mobile lifting equipment, a vehicle of the type having a cab mounted thereon, an operator's driving station within the cab, the cab being constructed to provide a space adjacent the driving station and accessible from the upper side, and a lifting equipment mounted on the vehicle and including a boom structure and a workman's basket mounted on the free end of the boom structure, the boom structure being movable to a position wherein the workman's basket is in said space at a level adjacent the driving station to permit the vehicle operator to enter the workman's basket without dismounting from the vehicle.

2. A combined truck and lift as in claim 1 wherein the cab includes a frontal windshield area, a substantial portion of the workman's basket when in a position adjacent the driving station being at a level below the upper portion of the windshield area.

3. A combined truck and lift as in claim 1 whererin storage space is provided within the cab near the workman's basket.

4. A combined truck and lift as in claim 1 wherein the cab is provided with a roof, the roof having an opening dimensioned to receive the basket to give the basket access to the space adjacent the driving station, and means for covering said opening when said basket is positioned adjacent said driving station.

5. In a combined truck and lift, a vehicle of the type having a cab mounted thereon and an operator's station within the cab, the cab being constructed to provide a space adjacent the driving station and accessible from the upper side, and lifting equipment mounted on the vehicle and including a boom structure and a workman's basket mounted on the free end of the boom structure, the boom structure being adapted to be raised and lowered about a horizontal axis and rotated about a vertical axis, the boom structure being movable into a position wherein the workman's basket is at a level alongside the driving station whereby the operator of the vehicle may enter the workman's basket without dismounting from the vehicle, the cab including a frontal windshield area, the upper edge of the workman's basket being below the upper edge of the frontal windshield area.

6. A combined truck and lift as in claim 5 wherein the cab is provided with a roof, the roof having an opening to give the basket access to said space adjacent the driving station, and means for covering said opening when said basket is positioned adjacent said driving station.

7. A combined truck and lift as in claim 6 wherein said means for covering said opening comprises a two-section canvas cover.

8. A combined truck and lift as in claim 6 wherein the opening in said cab lies in substantially one plane, a substantially flat cover, means for mounting said cover on the roof of said cab so that said cover may be moved diagonally with respect to the longitudinal axis of the vehicle between open and closed positions.

9. In a mobile lifting equipment, a vehicle of the type having a cab mounted thereon, an operator's driving station within the cab, the cab being constructed to provide a space generally alongside said driving station accessible from the driving station and accessible from the upper side, and a lifting equipment mounted on the vehicle and including a boom structure and a workman's basket mounted on the free end of the boom structure, the boom structure being adapted to be raised and lowered about a horizontal axis and rotated about a vertical axis, the boom structure being movable to a position wherein the workman's basket is in said space and at a position to permit the vehicle operator to enter the workman's basket without dismounting from the vehicle.

10. In a mobile lifting equipment, a vehicle, an operator's driving station mounted on the vehicle, and a lifting equipment mounted on the vehicle including means for raising and lowering a workman, and control means mounted on the raising and lowering means accessible to said workman so that said workman may control his raising and lowering, the raising and lowering means being movable to a position in the vicinity of and generally alongside said operator's driving station whereby the operator of the vehicle may enter the raising and lowering means without dismounting from the vehicle.

11. A mobile lifting equipment as in claim 10 wherein the vehicle is of a type which has a cab mounted thereon and in which the operator's driving station is disposed within the cab and in which the cab is constructed to provide a space in the vicinity of and generally alongside the driving station accessible from the upper side to accommodate the raising and lowering means.

12. A mobile lifting equipment as in claim 11 wherein the cab includes a frontal windshield area, and wherein a substantial portion of the raising and lowering means when in a position in the vicinity of and generally alongside the operator's driving station is at a level below the upper portion of the windshield area.

13. In a mobile lifting equipment, a vehicle, an operator's driving station for the vehicle, the vehicle being formed to provide a space adjacent the driving station and accessible from the upper side, and a lifting equipment mounted on the vehicle and including a boom structure and workman's platform or basket mounted on the free end of the boom structure, the boom structure being adapted to be raised and lowered about a horizontal axis and rotated about a vertical axis, the boom structure being movable to a position wherein the workman's basket is in said space at a level adjacent the driving station to permit the vehicle operator to enter the workman's basket without dismounting from the vehicle.

14. A mobile lifting equipment as in claim 13 wherein said workman's basket or platform is substantially alongside said driving station when said workman's basket or platform is in a level adjacent the driving station.

15. In a combined truck and lift, a vehicle of the type having a cab mounted thereon and an operator's station within the cab, the cab being constructed to provide a space alongside the driving station and accessible from the upper side, and lifting equipment mounted on the vehicle and including a boom structure and a workman's basket mounted on the free end of the boom structure, the boom structure being adapted to be raised and lowered about a horizontal axis and rotated about a vertical axis, the boom structure being movable into a position wherein the workman's basket is in said space at a level substantially alongside the driving station whereby the operator of the vehicle may enter the workman's basket without dismounting from the vehicle.

16. In a combined truck and lift, a vehicle of the type having a cab mounted thereon and an operator's station within the cab on one side of the cab, the cab being constructed to provide a space on the other side of the cab adjacent the driving station and accessible from the upper side, and lifting equipment mounted on the vehicle and including a boom structure and a workman's platform or basket mounted on the free end of the boom structure, the boom structure being adapted to be raised and lowered about a horizontal axis and rotated about a vertical axis, the boom structure being movable into a position wherein when the workman's basket is in said space the operator of the vehicle may enter the workman's basket or platform without dismounting from the vehicle.

17. In a mobile lifting equipment, a vehicle, an operator's driving station mounted on one side of the vehicle to provide a space on the other side of the vehicle accessible from the upper side, and lifting equipment mounted on the vehicle including means for raising and lowering a workman, the means for raising and lowering a workman being movable to a position in said space substantially alongside the operator's driving station so that the operator of the vehicle may enter the means for raising and lowering the workman without dismounting from the vehicle.

18. In a mobile lifting equipment, a vehicle of the type having a cab mounted thereon, an operator's driving station within the cab, the cab being constructed to enclose the operator's driving station and to provide an open space adjacent the driving station accessible from the upper side, the cab having an opening therein leading to the open space so that the operator may move from the driving station to said space, means for closing said opening, lifting equipment mounted on the vehicle and including a boom structure and a workman's basket mounted on the free end of the boom structure, the boom structure being adapted to be raised and lowered about a horizontal axis and rotated about a vertical axis, the boom structure being movable to a position wherein the workman's basket is in said space at a level adjacent the driving station to permit the vehicle operator to enter the workman's basket without dismounting from the vehicle.

19. A mobile lifting equipment as in claim 18 wherein said operator's driving station is mounted on one side of the cab and wherein said space is provided on the other side of said cab.

20. A mobile lifting equipment as in claim 19 wherein said opening leading from the operator's station to said space is inclined at an angle with respect to the side walls forming the cab and wherein said means for closing the opening consists of a door.

21. A mobile lifting equipment as in claim 19 wherein said cab is provided with a dividing wall separating the operator's station from said space, said dividing wall being provided with a window.

References Cited in the file of this patent

UNITED STATES PATENTS

| | | |
|---|---|---|
| 1,288,581 | Heina | Dec. 24, 1918 |
| 2,627,560 | Eitel | Feb. 3, 1953 |
| 2,724,620 | Johnson | Nov. 22, 1955 |